US012749503B1

(12) United States Patent
Peng

(10) Patent No.: US 12,749,503 B1
(45) Date of Patent: Sep. 29, 2026

(54) WAVEGUIDE MULTILAYER CORE STRUCTURE FOR USE IN HEAT ASSISTED MAGNETIC RECORDING

(71) Applicant: Seagate Technology LLC, Fremont, CA (US)

(72) Inventor: Chubing Peng, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/201,077

(22) Filed: May 7, 2025

(51) Int. Cl.
*G11B 5/48* (2006.01)
*G11B 5/73* (2006.01)

(52) U.S. Cl.
CPC .......... *G11B 5/4866* (2013.01); *G11B 5/7366* (2019.05)

(58) Field of Classification Search
None
See application file for complete search history.

(56) References Cited

U.S. PATENT DOCUMENTS 9,147,427 B1 * 9/2015 Lee .................... G11B 7/1387
9,396,749 B2 7/2016 Asselin et al.
9,484,051 B1 * 11/2016 Krichevsky .......... G11B 5/6088
9,558,764 B2 1/2017 Yang et al.
9,558,770 B2 1/2017 Yang et al.
9,601,144 B1 * 3/2017 Mehta .................... G11B 5/676
10,269,379 B1 4/2019 Goggin et al.
10,482,906 B2 11/2019 Chen et al.
10,872,628 B1 * 12/2020 Shimazawa .......... G11B 7/1387
10,978,102 B1 * 4/2021 Lai .................... G11B 5/6088
12,249,356 B1 * 3/2025 Lee .................... G11B 5/314
12,374,357 B1 * 7/2025 Zhou .................... G11B 7/1387
12,380,918 B1 * 8/2025 Peng .................... G11B 5/1475
2011/0205864 A1 * 8/2011 Huang .................... G11B 5/314
385/144
2012/0140609 A1 * 6/2012 Huang .................... G11B 5/314
385/124
2013/0033972 A1 * 2/2013 Hara .................... G11B 5/6088
2014/0043948 A1 * 2/2014 Hirata .................... G02B 6/1226
250/493.1
2015/0287425 A1 * 10/2015 Guler .................... G11B 5/3116
977/831
2016/0125901 A1 * 5/2016 Lee .................... G11B 13/08
369/13.33
2017/0323659 A1 * 11/2017 Matsumoto .......... G11B 5/3116
2023/0059099 A1 * 2/2023 Yu .................... G11B 13/08
2024/0135964 A1 * 4/2024 Wee .................... G11B 5/314

* cited by examiner

*Primary Examiner* — Fred Tzeng
(74) *Attorney, Agent, or Firm* — Mueting Raasch Group

(57) ABSTRACT

Described are recording heads for heat assisted magnetic recording that include a light delivery waveguide that delivers light for excitation of a near-field transducer, where the waveguide has a multilayer core. The multilayer core includes a top outer layer nearest to the near-field transducer that has a lower refractive index than an inner layer of multilayer core. The described waveguides having a multilayer core can improve NFT coupling efficiency, which in turn can allow the use of lower optical power density, and thus provide better reliability for recording head components such as the near-field transducer.

19 Claims, 4 Drawing Sheets

WAVEGUIDE MULTILAYER CORE STRUCTURE FOR USE IN HEAT ASSISTED MAGNETIC RECORDING

TECHNICAL FIELD

The disclosure relates to magnetic writers, and particularly to magnetic writers for heat assisted magnetic recording.

SUMMARY

In accordance with certain aspects, the present disclosure describes recording heads for heat assisted magnetic recording. Such recording heads may include a near-field transducer proximate a media-facing surface of the recording head, the near-field transducer configured to generate plasmons upon excitation by light coupled into the near-field transducer, and a light delivery waveguide extending from an energy source to the near-field transducer and configured to couple light from the energy source into the near-field transducer, the light delivery waveguide including a multilayer core. The multilayer core includes an inner core layer of a first dielectric material disposed between a top outer core layer of a second dielectric material a bottom outer core layer of a third dielectric material, wherein the multilayer core is oriented such that the top outer core layer is nearest to the near-field transducer, and wherein the first dielectric material has a first refractive index and the second dielectric material has a second refractive index that is lower than the first refractive index.

In accordance with certain aspects, the first dielectric material is a niobium oxide, a silicon carbide, a silicon nitride, a zirconium oxide, diamond, a boron nitride, a gallium nitride, a barium titanium oxide, or a strontium titanium oxide. In accordance with certain aspects, the second dielectric material is a tantalum oxide, a yttrium oxide, an amorphous aluminum nitride, a silicon nitride, a hafnium oxide, a zirconium oxide, or a zinc oxide. In accordance with certain aspects, the first refractive index is at least 2.1 and the second refractive index is at most 2.1. In accordance with certain aspects, the second dielectric material has a bandgap of about 3.8 eV or more.

In accordance with certain aspects, the multilayer core of the light delivery waveguide further includes an additional inner core layer of a fourth dielectric material, the additional inner core layer disposed between the inner core layer of the first dielectric material and the bottom outer core layer of the third dielectric material.

In accordance with certain aspects, the described recording heads further include a cladding layer disposed between the top outer core layer and the near-field transducer.

In accordance with certain aspects, the near-field transducer includes an emitter disk disposed between a middle disk and a sunken disk, wherein the sunken disk is oriented nearest to the light delivery waveguide. In accordance with certain aspects, the near-field transducer further includes a peg portion that extends from the emitter disk toward the media-facing surface of the recording head.

In accordance with certain aspects, the described recording heads further include a write pole disposed such that the near-field transducer is positioned between the write pole and the light delivery waveguide. In accordance with certain aspects, the described recording heads further include a heat sink disposed between the near-field transducer and the write pole.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
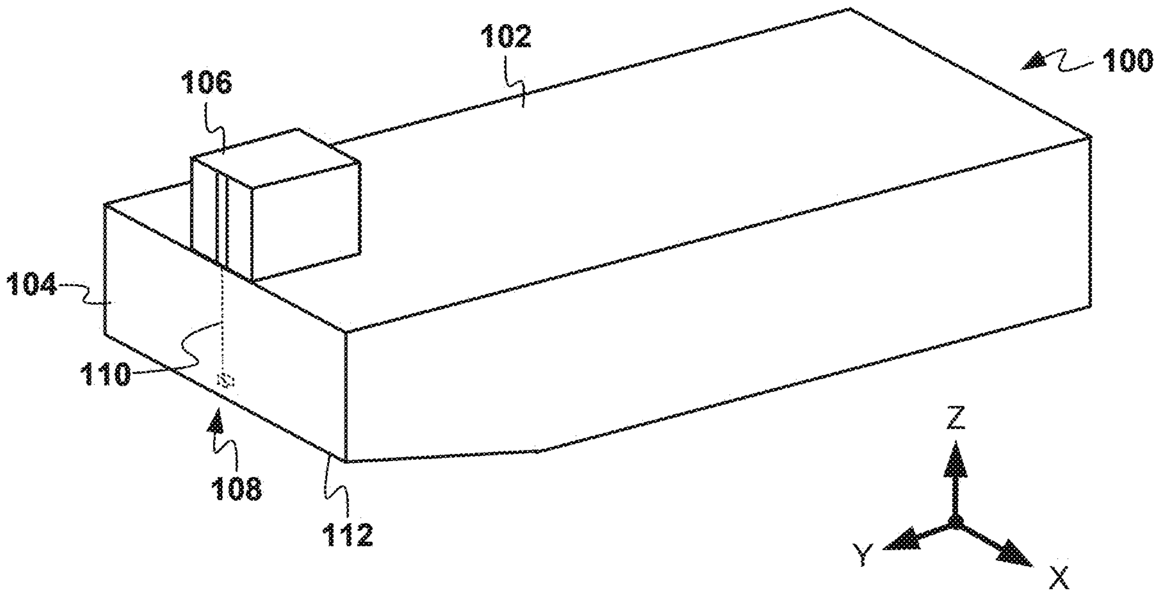
FIG. 1 is a schematic perspective view of a recording head that may incorporate multilayer waveguide cores in accordance with the present disclosure.

The present disclosure relates to energy assisted magnetic recording that utilizes electromagnetic radiation to excite plasmons in a near field transducer (NFT) that can be directed to a recording surface to lower the magnetic coercivity and thereby assist in the recording of bits using a magnetic field. An NFT is in essence a nanoscale "antenna" for directing plasmons at the media surface, often employed in heat assisted magnetic recording (HAMR). HAMR refers to the concept of locally heating the recording media to reduce the coercivity, thereby allowing the applied magnetic field to more easily direct the magnetization of the media during temporary magnetic softening. Once the media cools to ambient temperature, the coercivity has a sufficiently high value to assure thermal stability of the recorded information. This can allow for the use of small grain media with a larger magnetic anisotropy at room temperature to thereby enhance thermal stability, which is desirable for recording at increased areal densities. HAMR can be applied to any type of magnetic storage media, including granular and patterned media.

In operating a HAMR recording head, a waveguide delivers electromagnetic radiation, such as light from a laser, to the NFT to thereby produce NFT excitation. The efficiency of NFT excitation is generally determined by the incident field strength at the NFT multiplied by the coupling efficiency (CE) of the light from the waveguide into the NFT. It has been found that increasing the field strength to boost NFT excitation efficiency can have deleterious effects on the reliability of the NFT and the waveguide. As such, waveguide designs in accordance with the present disclosure relate to increasing the CE so that the field strength need not be increased. Increasing the CE promotes higher areal density capability (ADC) without the need to increase field strength, thus enhancing the longevity of various recording head components, including the NFT.

In accordance with various aspects, a light delivery waveguide is described that can improve CE proximate the NFT. Such waveguides include a multilayer dielectric waveguide core having a top layer, which is the layer nearer to the NFT, that has a lower refractive index than an interior layer of the waveguide core. Such a construction may assist in controlling the gap plasmon strength and improving NFT coupling efficiency. This may be distinguished from current waveguides that utilize a core of a single material having a high refractive index, which can lead to degraded CE due to high absorption at the bottom of the NFT (for example, at a sunken disk) near the high index waveguide core. By employing a waveguide in accordance with the present disclosure that has a multilayer core with a top layer having a lower refractive index than an inner core layer, such damping may be controlled, thus improving NFT excitation efficiency by enhancing CE. Without wishing to be bound by any theory, it has been observed that waveguide core materials having a lower refractive index can provide better reliability due to their wide bandgap. The increased coupling efficiency from using waveguide designs in accordance with the present disclosure can allow the use of lower optical power density, and thus provide better reliability.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

In reference to FIG. 1, a perspective view shows a recording head 100 according to an example embodiment. The recording head 100 may be used in a magnetic data storage device such as a HAMR hard disk drive. The recording head 100 may also be referred to herein interchangeably as a slider, head, write head, read head, and read/write head. The recording head 100 has a slider body 102 with read and write transducers 108 at a trailing edge 104 that are held proximate to a surface of a magnetic recording medium (not shown), such as a spinning magnetic disk. The illustrated recording head 100 is configured for a HAMR device, and so it includes components that form a hot spot on the recording medium near the read and write transducers 108. These HAMR components include an energy source 106 (such as a laser diode) and a waveguide 110. The waveguide 110 delivers electromagnetic energy from the energy source 106 to an NFT that is part of the read/write transducers 108. The NFT achieves surface plasmon resonance and directs the energy out of a media-facing surface 112 to create a small hot spot in the recording medium.

Figure 2:
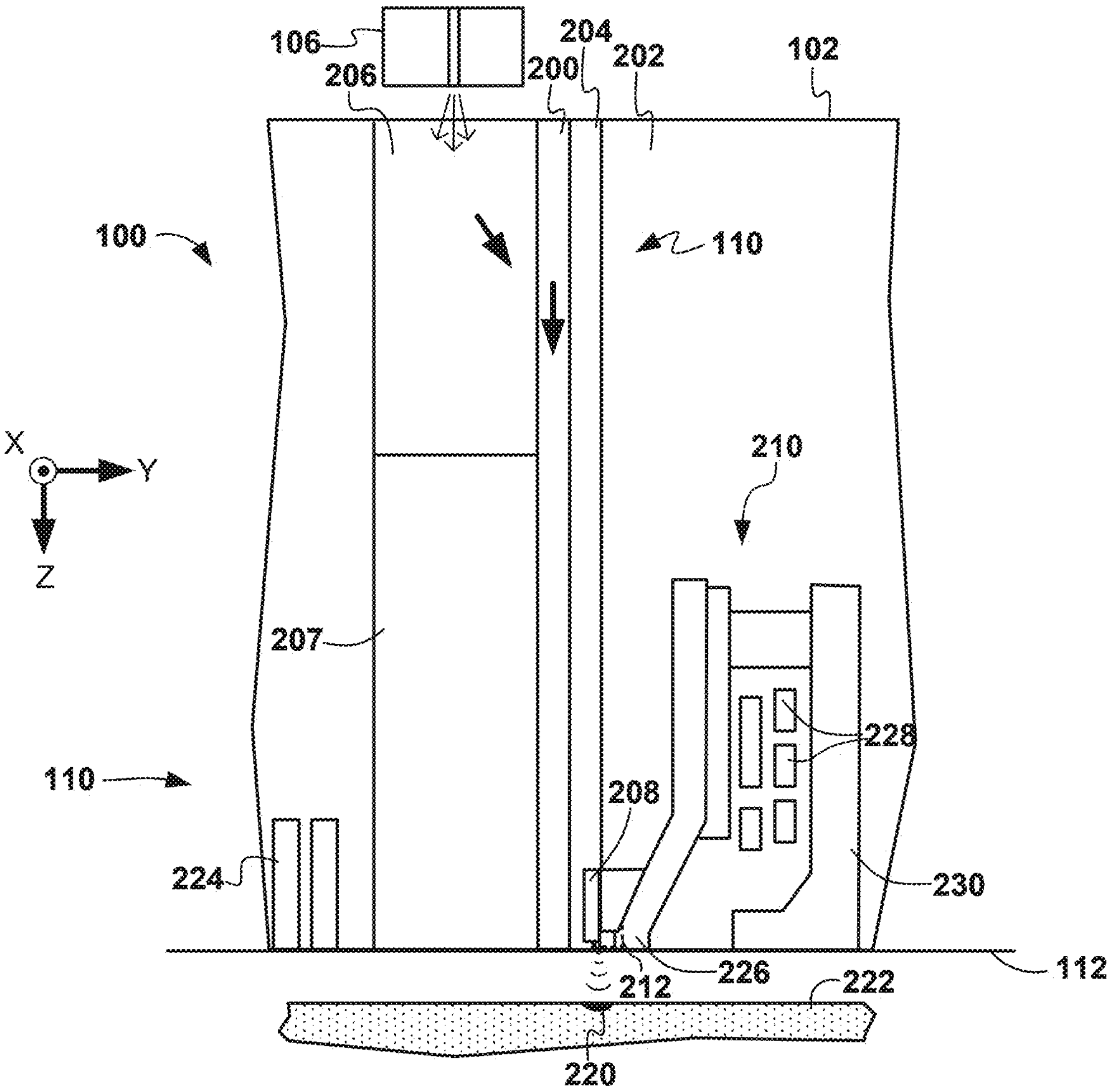
FIG. 2 is a schematic cross-sectional view of a slider body incorporating a multilayer waveguide core in accordance with the present disclosure.
Figure 3:
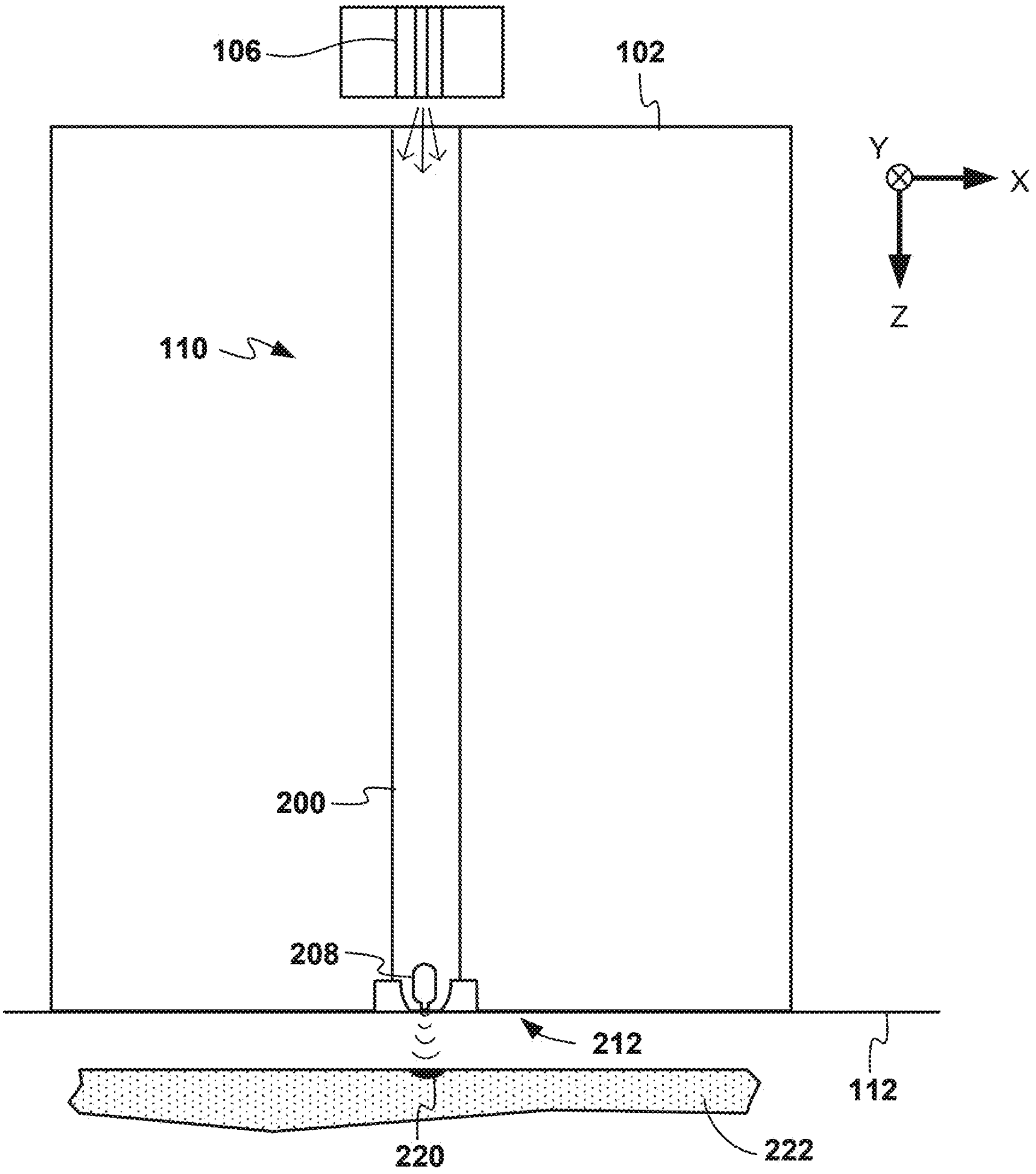
FIG. 3 is a schematic plane view of a slider body incorporating a multilayer waveguide core in accordance with the present disclosure.

In FIGS. 2 and 3, respective cross-sectional and wafer plane views of the slider body 102 show a light delivery system according to an example embodiment. The slider body includes an NFT 208, a magnetic writer 210 and a mirror assembly 212, sometimes referred to as a subwavelength mirrors, subwavelength focusing mirrors, subwavelength solid immersion mirrors (SIMs), mini-SIMs, mSIMs, and so forth. Light, emitting from the laser diode 106, is coupled into a three-dimensional, single mode channel waveguide 110 by a waveguide input coupler 206, which directs the light to a waveguide core 200. The input coupler 206 is replaced by a bottom cladding layer 207 towards the media-facing surface 112. Note that other waveguide and input coupler arrangements may be used with the NFT 208 and mirror assembly 212.

The NFT 208 has a plate-like, enlarged part with two curved ends and a protruded peg. Other shapes may be possible for the enlarged part of the NFT 208, for example rectangular, triangular, and so forth. The NFT 208 is placed proximate a side cladding layer 204 and top cladding layer 202 of the waveguide 110 and near the waveguide core 200. The NFT 208 could be also placed adjacent to the waveguide core 200 without the use of a cladding layer. The NFT 208 achieves plasmonic resonance in response to the light coupled via the waveguide 110 and creates a small hotspot 220 on a surface of a recording medium 222 (such as a magnetic disk) during recording. The NFT 208 is proximate a write pole 226 of the writer 210. The writer 210 includes coils 228 that induce a magnetic flux through the write pole 226. A flux path is created between the write pole 226 and a return pole 230 of the writer 210. There may be more than one return pole, for example on a side of the NFT 208 facing the reader.

In accordance with the present disclosure, the waveguide core 200 includes a multilayer construction that has a lower refractive index layer disposed closer to the NFT 208 than the other layers of the waveguide core 200. In certain aspects, the multilayer waveguide core may include three layers, for example a higher refractive index inner layer sandwiched between two lower refractive index outer layers, or may include four layers, for example a dual layer inner core of two higher refractive index layers that are sandwiched between lower refractive index outer layers.

A magnetic reader 224 is shown down-track from the NFT 208 and the magnetic writer 210. The magnetic reader 224 may include a magneto-resistive stack that changes resistance in response to changes in magnetic field detected from the recording medium 222. These changes in magnetic field are converted to data by a read channel of an apparatus that houses the head 100 and recording medium 222.

Figure 4:
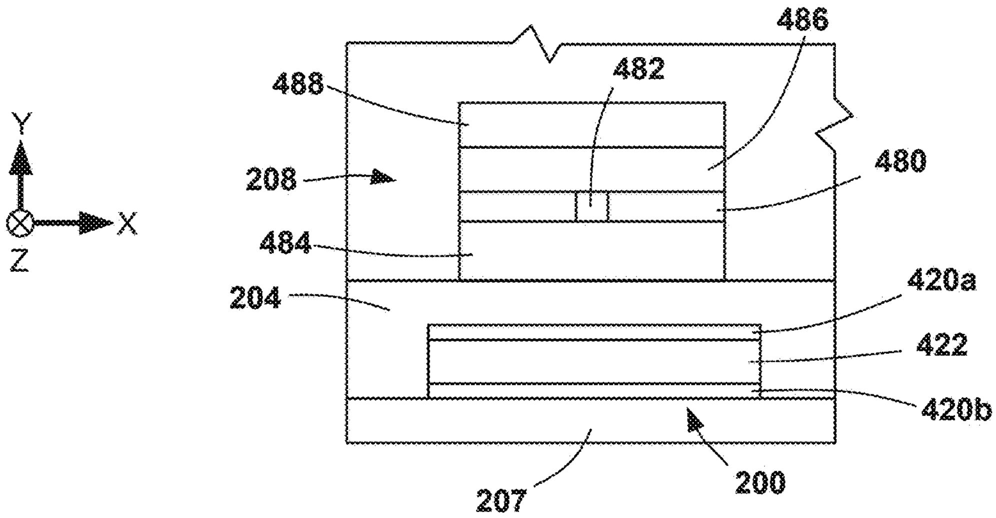
FIG. 4 is a schematic cross-sectional view of a multilayer waveguide core in accordance with the present disclosure adjacent to a near field transducer.
Figure 5:
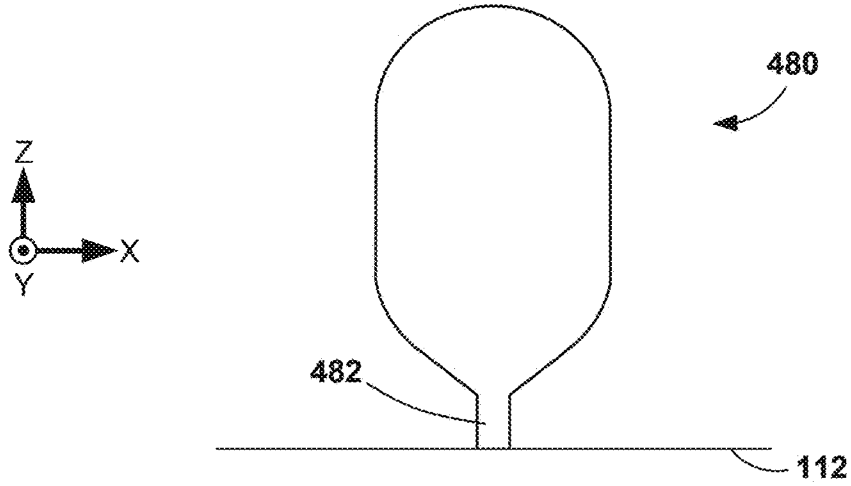
FIG. 5 schematically illustrates the shape of a near field transducer that may be utilized in a recording head incorporating a multilayer waveguide core in accordance with the present disclosure.

As schematically illustrated in FIGS. 4 and 5, in one or more embodiments, a HAMR write transducer uses a plate-type NFT 208 with an enlarged emitter part 480 that collects optical energy being directed on it by adjacent reflectors. The NFT 208 is shaped with a peg 482 that extends to the media-facing surface 112, and energy in the form of surface plasmons is directed towards the peg 482 where it is shaped and directed to heat the recording medium. Other NFT shapes may achieve this shaping and directing of surface plasmons. The NFT may have other features such as a heat sink 488, a sunken disk 484, a middle disk 486, and so forth, which may be configured to help ensure desired performance and longevity of the NFT 208.

As indicated in FIG. 4, a waveguide having a multilayer core 200 may be disposed adjacent to NFT 208. FIG. 4 indicates that waveguide core 200 has at least three layers, which include an inner layer 422 disposed between two outer layers **420*a* and 420*b*. Top outer layer 420*a* and bottom outer layer 420*b* may be composed of the same materials or different materials. Top outer layer 420*a* is considered the top layer of the multilayer core 200 because it is positioned nearest to the NFT 208. Top outer layer 420*a* is composed of a material having a refractive index that is lower than that of the interior layer 422. For example, the refractive index of the top outer layer may be no higher than 2.1, and preferably no higher than 2.0, whereas the refractive index of the interior layer may be at least 2.1, and preferably at least 2.2. It may also be desired for the dielectric material of the top outer layer to have a wide bandgap, for example about 3.8 eV or more. A cladding layer 204 may be disposed between the multilayer core 200 and the sunken disk 484 of NFT 208. As indicated, the cladding layer 204 may surround the sides of the waveguide core 200 as well as being disposed between the waveguide core 200 and the NFT 208. A bottom cladding layer 207 may be disposed below the waveguide core 200, and may be the same material as cladding layer 204** or may be composed of a different material.

Exemplary three layer waveguide cores may include an inner layer of niobium oxide ($NbO_x$), for example having a refractive index of about 2.29 and a thickness of about 70 nm, disposed between two outer layers of tantalum oxide ($TaO_x$), for example each having a refractive index of about 2.09 and a thickness of about 35 nm. Exemplary three layer waveguide cores may also include an inner layer of niobium oxide ($NbO_x$), for example having a refractive index of about 2.29 and a thickness of about 120 nm, disposed between two outer layers of yttrium oxide ($YO_x$ moieties such as $Y_2O_3$), for example each having a refractive index of about 1.9 and a thickness of about 10 nm. Exemplary three layer waveguide cores may also include an inner layer of niobium oxide ($NbO_x$), for example having a refractive index of about 2.29 and a thickness of about 120 nm, disposed between two outer layers of amorphous aluminum nitride (AlN), for example each having a refractive index of about 1.75 and a thickness of about 10 nm. Exemplary three layer waveguide cores may also include an inner layer of silicon carbide (SiC), for example having a refractive index of about 2.7 and a thickness of about 60 nm, disposed between two outer layers of yttrium oxide ($YO_x$ moieties such as $Y_2O_3$), for example each having a refractive index of about 1.9 and a thickness of about 20 nm. Exemplary three layer waveguide cores may also include an inner layer of silicon carbide (SiC), for example having a refractive index of about 2.7 and a thickness of about 65 nm, disposed between two outer layers of amorphous aluminum nitride (AlN), for example each having a refractive index of about 1.75 and a thickness of about 17.5 nm.

Exemplary four layer waveguide cores may include a dual inner layer composed of a 18.75 nm thick layer of $NbO_x$ disposed on top of a 45 nm thick layer of SiC, with the dual inner layer disposed between a 18.75 nm thick $YO_x$ top outer layer and a 37.5 nm thick $YO_x$ bottom outer layer. Exemplary four layer waveguide cores may include a dual inner layer composed of a 15 nm thick layer of SiC disposed on top of a nm thick layer of a 80 nm thick $NbO_x$ layer, with the dual inner layer disposed between a 15 nm thick $YO_x$ top outer layer and a 30 nm thick $YO_x$ bottom outer layer. Exemplary four layer waveguide cores may include a dual inner layer composed of a 40 nm thick layer of SiC disposed on top of a nm thick layer of a 50 nm thick $NbO_x$ layer, with the dual inner layer disposed between a 10 nm thick $YO_x$ top outer layer and a 20 nm thick $YO_x$ bottom outer layer. Exemplary four layer waveguide cores may include a dual inner layer composed of a 37.5 nm thick layer of SiC disposed on top of a nm thick layer of a 60 nm thick $NbO_x$ layer, with the dual inner layer disposed between a 7.5 nm thick AlN top outer layer and a 15 nm thick $YO_x$ bottom outer layer.

In certain aspects, materials that may be used for the outer layers of multilayer waveguides in accordance with the present disclosure may include $TaO_x$ (n=2.09, bandgap around 3.8 to 5.3 eV), silicon nitride (such as $Si_3N_4$), hafnium oxide (such as $HfO_2$), yttrium oxide ($Y_2O_3$), zirconium oxide (such as $ZrO_2$), aluminum nitride (amorphous AlN), or zinc oxide (such as $ZnO_2$). In certain aspects, materials that may be used for the interior layers of multilayer waveguides in accordance with the present disclosure may include $NbO_x$ (n=2.29, bandgap around 3.2 to 4 eV), $TiO_x$ (n=2.31, bandgap around 3.2 eV), silicon nitride (Si rich), diamond, boron nitride, silicon carbide (SiC), gallium nitride (GaN), or titanium oxides such as barium titanium oxide ($BaTiO_3$), strontium titanium oxide ($SrTiO_3$), or combinations thereof.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques).

All scientific and technical terms used herein have meanings commonly used in the art unless otherwise specified. The definitions provided herein are to facilitate understanding of certain terms used frequently herein and are not meant to limit the scope of the present disclosure.

As used herein, the term “configured to” may be used interchangeably with the terms “adapted to” or “structured to” unless the content of this disclosure clearly dictates otherwise.

As used herein, the term “or” refers to an inclusive definition, for example, to mean “and/or” unless its context of usage clearly dictates otherwise. The term “and/or” refers to one or all of the listed elements or a combination of at least two of the listed elements.

As used herein, the phrases “at least one of” and “one or more of” followed by a list of elements refers to one or more of any of the elements listed or any combination of one or more of the elements listed.

As used herein, the terms “coupled” or “connected” refer to at least two elements being attached to each other either directly or indirectly. An indirect coupling may include one or more other elements between the at least two elements being attached. Further, in one or more embodiments, one element “on” another element may be directly or indirectly on and may include intermediate components or layers therebetween. Either term may be modified by “operatively” and “operably,” which may be used interchangeably, to describe that the coupling or connection is configured to allow the components to interact to carry out described or otherwise known functionality.

As used herein, any term related to position or orientation, such as “proximal,” “distal,” “end,” “outer,” “inner,” and the like, refers to a relative position and does not limit the absolute orientation of an embodiment unless its context of usage clearly dictates otherwise.

The singular forms “a,” “an,” and “the” encompass embodiments having plural referents unless its context clearly dictates otherwise.

As used herein, “have,” “having,” “include,” “including,” “comprise,” “comprising” or the like are used in their open-ended sense, and generally mean “including, but not limited to.” It will be understood that “consisting essentially of,” “consisting of,” and the like are subsumed in “comprising,” and the like.

Reference to “one embodiment,” “an embodiment,” “certain embodiments,” or “some embodiments,” etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A recording head for heat assisted magnetic recording, comprising:

a near-field transducer proximate a media-facing surface of the recording head, the near-field transducer configured to generate plasmons upon excitation by light coupled into the near-field transducer, wherein the near-field transducer comprises an emitter disk disposed between a middle disk and a sunken disk; and a light delivery waveguide extending from an energy source to the sunken disk of the near-field transducer and configured to couple light from the energy source into the near-field transducer, the light delivery waveguide comprising a multilayer core, the multilayer core comprising an inner core layer of a first dielectric material disposed between a top outer core layer of a second dielectric material a bottom outer core layer of a third dielectric material, wherein the multilayer core is oriented such that the top outer core layer is nearest to the near-field transducer, and wherein the first dielectric material has a first refractive index and the second dielectric material has a second refractive index that is lower than the first refractive index.

2. The recording head of claim 1, wherein the third dielectric material has a third refractive index, and wherein the third refractive index is the same as the second refractive index.

3. The recording head of claim 1, wherein the first dielectric material is a niobium oxide, silicon nitride, a zirconium oxide, a silicon carbide, diamond, a boron nitride, a gallium nitride, a barium titanium oxide, or a strontium titanium oxide.

4. The recording head of claim 1, wherein the second dielectric material is a tantalum oxide, a yttrium oxide, an amorphous aluminum nitride, a silicon nitride, a hafnium oxide, a zirconium oxide, or a zinc oxide.

5. The recording head of claim 1, wherein the first refractive index is at least 2.1 and the second refractive index is at most 2.1.

6. The recording head of claim 1, wherein the second dielectric material has a bandgap of about 3.8 eV or more.

7. The recording head of claim 1, wherein the multilayer core comprises one of the following combinations:

(i) the first dielectric material is niobium oxide, the second dielectric material is tantalum oxide, and the third dielectric material is tantalum oxide;

(ii) the first dielectric material is niobium oxide, the second dielectric material is yttrium oxide, and the third dielectric material is yttrium oxide;

(iii) the first dielectric material is niobium oxide, the second dielectric material is amorphous aluminum nitride, and the third dielectric material is amorphous aluminum nitride;

(iv) the first dielectric material is silicon carbide, the second dielectric material is yttrium oxide, and the third dielectric material is yttrium oxide; or (v) the first dielectric material is silicon carbide, the second dielectric material is amorphous aluminum nitride, and the third dielectric material is amorphous aluminum nitride.

8. The recording head of claim 1, wherein the multilayer core of the light delivery waveguide further comprises an additional inner core layer of a fourth dielectric material, the additional inner core layer disposed between the inner core layer of the first dielectric material and the bottom outer core layer of the third dielectric material.

9. The recording head of claim 8, wherein the multilayer core comprises one of the following combinations:

(i) the first dielectric material is niobium oxide, the fourth dielectric material is silicon carbide, the second dielectric material is yttrium oxide, and the third dielectric material is yttrium oxide;

(ii) the first dielectric material is silicon carbide, the fourth dielectric material is niobium oxide, the second dielectric material is yttrium oxide, and the third dielectric material is yttrium oxide; or (iii) the first dielectric material is silicon carbide, the fourth dielectric material is niobium oxide, the second dielectric material is amorphous aluminum nitride, and the third dielectric material is yttrium oxide.

10. The recording head of claim 1, further comprising a cladding layer disposed between the top outer core layer and the near-field transducer.

11. The recording head of claim 1, wherein the near-field transducer further comprises a peg portion that extends from the emitter disk toward the media-facing surface of the recording head.

12. The recording head of claim 1, further comprising a write pole disposed such that the near-field transducer is positioned between the write pole and the light delivery waveguide.

13. The recording head of claim 12, further comprising a heat sink disposed between the near-field transducer and the write pole.

14. A hard disk drive incorporating the recording head of claim 1.

15. The recording head of claim 1, wherein the inner core layer has a thickness in a range of about 60 nm to about 120 nm and each of the top outer core layer and the bottom outer core layer has a thickness in a range of about 10 nm to about 35 nm.

16. The recording head of claim 1, further comprising a bottom cladding layer disposed below the multilayer core of the light delivery waveguide.

17. The recording head of claim 16, wherein the bottom cladding layer is composed of a same material as the cladding layer disposed between the top outer core layer and the near-field transducer.

18. The recording head of claim 1, wherein the energy source comprises a laser diode.

19. The recording head of claim 1, further comprising a mirror assembly configured to direct light toward the near-field transducer.

* * * * *